(12) United States Patent
Bodin (10) Patent No.: US 11,034,399 B2
(45) Date of Patent: Jun. 15, 2021

(54) SUSPENSION ARRANGEMENT FOR A TRACKED VEHICLE COMPRISING PARTS OF DIFFERENT MODULUS OF ELASTICITY

(71) Applicant: BAE Systems Hägglunds Aktiebolag, Örnsköldsvik (SE)

(72) Inventor: Anders Bodin, Örnsköldsvik (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 247 days.

(21) Appl. No.: 16/302,591

(22) PCT Filed: May 9, 2017

(86) PCT No.: PCT/SE2017/050463
§ 371 (c)(1),
(2) Date: Nov. 16, 2018

(87) PCT Pub. No.: WO2017/200462
PCT Pub. Date: Nov. 23, 2017

(65) Prior Publication Data
US 2019/0210670 A1    Jul. 11, 2019

(30) Foreign Application Priority Data

May 17, 2016   (SE) .................................... 1650662-8

(51) Int. Cl.
*B62D 55/108* (2006.01)
*B60G 11/20* (2006.01)
(Continued)

(52) U.S. Cl.
CPC ......... *B62D 55/1083* (2013.01); *B60G 3/145* (2013.01); *B60G 11/183* (2013.01);
(Continued)

(58) Field of Classification Search
CPC .. B62D 55/108; B62D 55/1083; B60G 3/145; B60G 11/20
See application file for complete search history.

(56) References Cited

U.S. PATENT DOCUMENTS 2,983,505 A * 5/1961 Hanslip ................ B60G 11/187
267/284
3,504,930 A    4/1970 Kozowyk et al.
(Continued)

FOREIGN PATENT DOCUMENTS

| CN | 101865234 A | 10/2010 |
|---|---|---|
| EP | 0479061 A1 | 4/1992 |
| WO | 2012/097855 A1 | 7/2012 |

OTHER PUBLICATIONS

International Search Report and Written Opinion received for PCT Patent Application No. PCT/SE2017/050463, dated Jul. 11, 2017, 10 pages.

(Continued)

*Primary Examiner* — Tony H Winner
(74) *Attorney, Agent, or Firm* — Morrison & Foerster LLP (57) ABSTRACT

The present invention relates to a suspension arrangement for a tracked vehicle. The suspension arrangement includes a road wheel arm having a wheel axle portion for supporting a wheel of the vehicle and a pivot axle portion. The road wheel arm is pivotably journalled at the pivot axle portion to a housing that is fixable to the vehicle body. A torsion bar is connected to the pivot axle portion and a torsion tube is arranged to be connected to the vehicle body, with the torsion bar running through the torsion tube and arranged to be connected to the torsion tube. The modulus of elasticity of the torsion tube material is lower than the modulus of (Continued)

elasticity of the torsion bar material such that the maximum suspension travel is increased.

11 Claims, 4 Drawing Sheets

(51) Int. Cl.
*B60G 3/14* (2006.01)
*B60G 11/18* (2006.01)
*B60G 17/027* (2006.01)
*F16F 3/02* (2006.01)
*F16F 1/14* (2006.01)

(52) U.S. Cl.
CPC .......... *B60G 11/20* (2013.01); *B60G 17/0277* (2013.01); *F16F 1/14* (2013.01); *F16F 3/02* (2013.01); *B60G 2202/122* (2013.01); *B60G 2202/134* (2013.01); *B60G 2202/32* (2013.01); *B60G 2202/413* (2013.01); *B60G 2206/42* (2013.01); *B60G 2206/71* (2013.01); *B60G 2206/72* (2013.01); *B60G 2300/32* (2013.01); *B60G 2500/30* (2013.01)

(56) References Cited

U.S. PATENT DOCUMENTS

| | | | |
|---|---|---|---|
| 3,504,932 A | 4/1970 | Kozowyk et al. | |
| 3,913,939 A | 10/1975 | Sinclair et al. | |
| 4,659,069 A * | 4/1987 | Odobasic | B64C 25/64 244/104 R |
| 5,158,321 A * | 10/1992 | Maul | B60G 3/145 267/285 |
| 5,326,128 A * | 7/1994 | Cromley, Jr. | B60G 3/145 180/906 |
| 6,145,858 A * | 11/2000 | Foulquier | B60G 3/145 280/124.13 |
| 6,698,767 B2 * | 3/2004 | Hagan | B60G 9/00 280/124.107 |
| 8,505,888 B2 * | 8/2013 | Whitaker | F16F 1/16 267/273 |
| 8,720,922 B2 * | 5/2014 | VanDenberg | B60G 9/003 280/124.166 |
| 9,694,861 B2 * | 7/2017 | Thomas | E02F 9/2207 |
| 2010/0270769 A1 * | 10/2010 | VanDenberg | B60G 11/64 280/124.157 |
| 2013/0087957 A1 | 4/2013 | Riedl et al. | |
| 2015/0166133 A1 * | 6/2015 | Eavenson, Sr. | B62D 55/108 305/134 |

OTHER PUBLICATIONS

Office Action received for Swedish Patent Application No. 1650662-8, dated Nov. 30, 2016, 11 pages.
Office Action received for Swedish Patent Application No. 1650662-8, dated Jul. 11, 2017, 4 pages.

* cited by examiner

SUSPENSION ARRANGEMENT FOR A TRACKED VEHICLE COMPRISING PARTS OF DIFFERENT MODULUS OF ELASTICITY

CROSS REFERENCE TO RELATED APPLICATIONS

This application is a U.S. National Phase patent application under 35 U.S.C. § 371 of PCT/SE2017/050463, filed May 9, 2017, which claims priority to Swedish Patent Application No. SE 1650662-8, filed May 17, 2016, the disclosures of which are incorporated herein by reference in their entirety.

TECHNICAL FIELD

The present invention relates to a suspension arrangement for a tracked vehicle according to the preamble of claim 1. The present invention also relates to a vehicle.

BACKGROUND ART

Traditionally suspension arrangements with a set of road wheel arms, each road wheel arm being connected to a steel torsion bar, have been used for suspension on military tracked vehicles. The road wheel arm has at one side a road wheel axle portion with bearings for road wheels and on the other side of the road wheel arm, a pivot axle portion which is rotatably supported in a road wheel arm housing. The housing is fixed to the body of the vehicle. The first side of a steel torsion bar is fixed to the second side of the road wheel arm and the second side of the steel torsion bar is rotatably fixed to a road wheel housing on the opposite side of the vehicle.

The maximum suspension travel is limited due to limitations in yield strength for the steel in the torsion bar and due to the length of the torsion bar. The maximum length of the torsion bar is dependent on the width of the vehicle. In order to increase the maximum suspension travel or maintaining it at increased vehicle weight with such a suspension arrangement is to increase the length of the road wheel arms and correspondingly increasing the stiffness of the torsions bars which thus requires increased diameter of the torsion bars. Increased length of the road wheel arms moves the road wheels backwardly increasing the length of the vehicle and moving the force resultant of the road wheel forces backwards. The vehicle weight is further increased and if the torsion bars already are carrying maximum load the centre of gravity need to be moved rearward to avoid the ground clearance of the vehicle to be low at the front.

A further problem with such a suspension arrangement is that the ground clearance of the vehicle cannot be changed, neither keep the ground clearance when the vehicle weight is increased or the centre of gravity is changed.

U.S. Pat. No. 3,371,940 discloses a suspension arrangement comprising a road wheel arm having a wheel axle portion configured to support a wheel of the vehicle and a pivot axle portion, the road wheel arm being pivotably journalled at said pivot axle portion to a housing configured to be fixed to the vehicle body. A torsion bar is connected to the pivot axle portion, and a torsion tube is connected to the vehicle body, said torsion bar running through the torsion tube and being connected to the torsion tube. The suspension arrangement comprises a pivoted anchor having a lever. A hydraulic cylinder is connected between the lever and the body of the vehicle and is configured to change the ground clearance of the vehicle by pivoting the anchor.

There is however a need to present improvement in such suspension arrangements for tracked vehicles.

OBJECTS OF THE INVENTION

An object of the present invention is to provide a suspension arrangement for a tracked vehicle which facilitates increasing the maximum suspension travel in an efficient way.

SUMMARY OF THE INVENTION

These and other objects, apparent from the following description, are achieved by a suspension arrangement for a tracked a vehicle and a tracked vehicle as set out in the appended independent claims. Preferred embodiments of the suspension arrangement for a tracked a vehicle are defined in appended dependent claims.

Specifically an object of the invention is achieved by a suspension arrangement for a tracked vehicle. Said suspension arrangement comprises a road wheel arm having a wheel axle portion configured to support a wheel of the vehicle and a pivot axle portion. The road wheel arm is pivotably journalled at said pivot axle portion to a housing configured to be fixed to the vehicle body, a torsion bar being connected to the pivot axle portion, a torsion tube being arranged to be connected to the vehicle body, said torsion bar running through the torsion tube and being connected to the torsion tube. The modulus of elasticity of the torsion tube material is lower than the modulus of elasticity of the torsion bar material. The modulus of elasticity of the torsion tube material is lower than the modulus of elasticity of the torsion bar material so as to increase the maximum suspension travel. By providing a torsion tube with a material having a modulus of elasticity that is lower than the modulus of elasticity of the material of the torsion bar the maximum suspension travel may be increased in an efficient way. Hereby the vehicle length is not affected and the vehicle weight is only slightly affected. Further, increase of maximum suspension travel may be obtained without moving the force resultant of the road wheel forces backwards and by that avoid the need to move the centre of gravity rearwards. By thus increasing the maximum suspension travel an increased vehicle speed in bumpy terrain is facilitated. Further, the risk to hit the road wheel suspension stop or to hit the ground with sprocket or idler is reduced. The invention also makes it possible to increase the ground clearance of the vehicle which, improves mobility in deep snow, reduces the risk to hit the belly when driving in rough terrain and also improves the resistance against mines due to an increased distance to the mine.

According to an embodiment of the suspension arrangement said torsion tube material has a yield strength which essentially corresponds to the yield strength of the torsion bar material. This facilitates increasing the maximum suspension travel in that a relatively high yield strength, i.e. essentially the same yield strength as the torsion tube, facilitates providing a torsion tube with relatively thin walls and still being able to withstand the torque.

According to an embodiment of the suspension arrangement said torsion tube material has a modulus of elasticity in the range of 70-130 GPa.

According to an embodiment of the suspension arrangement said torsion bar material has a modulus of elasticity in the range of 200-215 GPa.

According to an embodiment of the suspension arrangement said torsion tube material has a yield strength in the range of 800-1500 MPa.

According to an embodiment of the suspension arrangement said torsion bar material has a yield strength in the range of 1500-2200 MPa. The yield strength of the torsion bar is obtained by strain hardening, wherein the torsion bar is rotated plastically to get negative stresses at the surface at unloaded condition.

According to an embodiment of the suspension arrangement said torsion bar is made of steel. Steel is a very efficient material for a torsion bar due to the relatively high yield strength. The yield strength is according to an embodiment obtained by plastic deformation.

According to an embodiment of the suspension arrangement said torsion tube is made of titanium alloy. The titanium alloy is according to an embodiment a so called high strength titanium alloy. Titanium is a very efficient material for a torsion tube as it provides a modulus of elasticity that is substantially lower than steel and has a yield strength that is essentially the same as steel.

According to an embodiment of the suspension arrangement the torsion tube is arranged to be connected to the vehicle body via a connecting element pivotably journaled in opposite housing, and wherein said torsion bar is connected to the torsion tube via said connecting element. Hereby an efficient construction for providing an efficient suspension arrangement is provided.

The dimensions of the torsion tube and torsion bar, e.g. the outer and inner diameter of the torsion tube and diameter of the torsion tube depend on certain properties comprising the wheel load. Said dimensions further depend on the desired natural frequency of the suspension system of the vehicle.

The inner diameter of the torsion tube is greater than the outer diameter of the joint, e.g. splined joint, of the torsion tube.

The diameter of the torsion bar and the thickness of the torsion tube are adapted such that they withstand the torque occurring when the support wheel reaches the suspension stop during suspension/spring action without remaining deformation.

Higher yield strength on the torsion bar and torsion tube and lower modulus of elasticity on the torsion tube provides increased maximum suspension travel, i.e. the suspension stop may be arranged at a distance further away.

According to an embodiment the suspension arrangement further comprises a ground clearing arrangement comprising a pivot anchor pivotably journalled at the housing, said torsion tube being connected to a pivot portion of the pivot anchor, wherein an actuator unit is arranged to be connected between the pivot anchor and the vehicle body for varying the ground clearance of the vehicle.

Specifically an object of the invention is achieved by a vehicle comprising a suspension arrangement as set out herein.

According to an embodiment the vehicle is a tracked vehicle.

BRIEF DESCRIPTION OF THE DRAWINGS

For a better understanding of the present invention reference is made to the following detailed description when read in conjunction with the accompanying drawings, wherein like reference characters refer to like parts throughout the several views, and in which.

DETAILED DESCRIPTION

Figure 1:
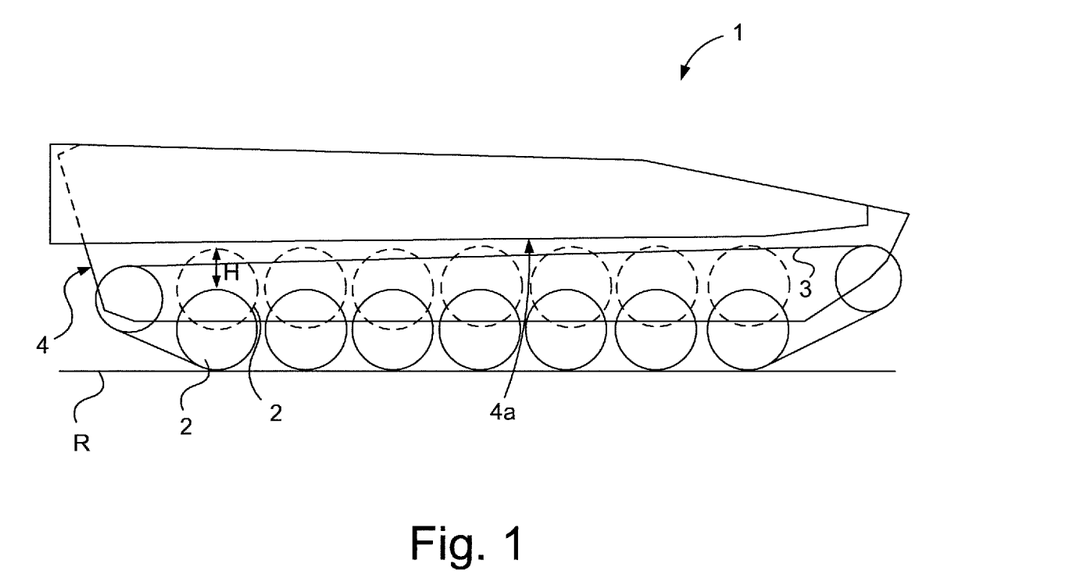
FIG. 1 schematically illustrates a side view of a tracked vehicle according to the present invention.

FIG. 1 schematically illustrates a side view of a motor vehicle 1. The exemplified vehicle 1 is constituted by a tracked vehicle such as a military tracked vehicle comprising a plurality of wheels 2 and a propulsion track 3 running around the wheels for driving of the vehicle. Further the vehicle 1 comprises a vehicle body 4, which includes the chassis of the vehicle and bodywork. Even if the illustrated motor vehicle 1 is a tracked vehicle the motor vehicle 1 may according to other embodiments of the invention be constituted by wheeled vehicles. The vehicle comprises a suspension arrangement according to the present invention so as to facilitate increasing the maximum suspension travel. The suspension travel of the suspension arrangement for the tracked vehicle 1 is illustrated by the wheels 2 being moved relative to a road wheel suspension stop 4a a distance H from a static position to the position corresponding to maximum spring action. The suspension travel thus corresponds to the distance H.

Figure 2:
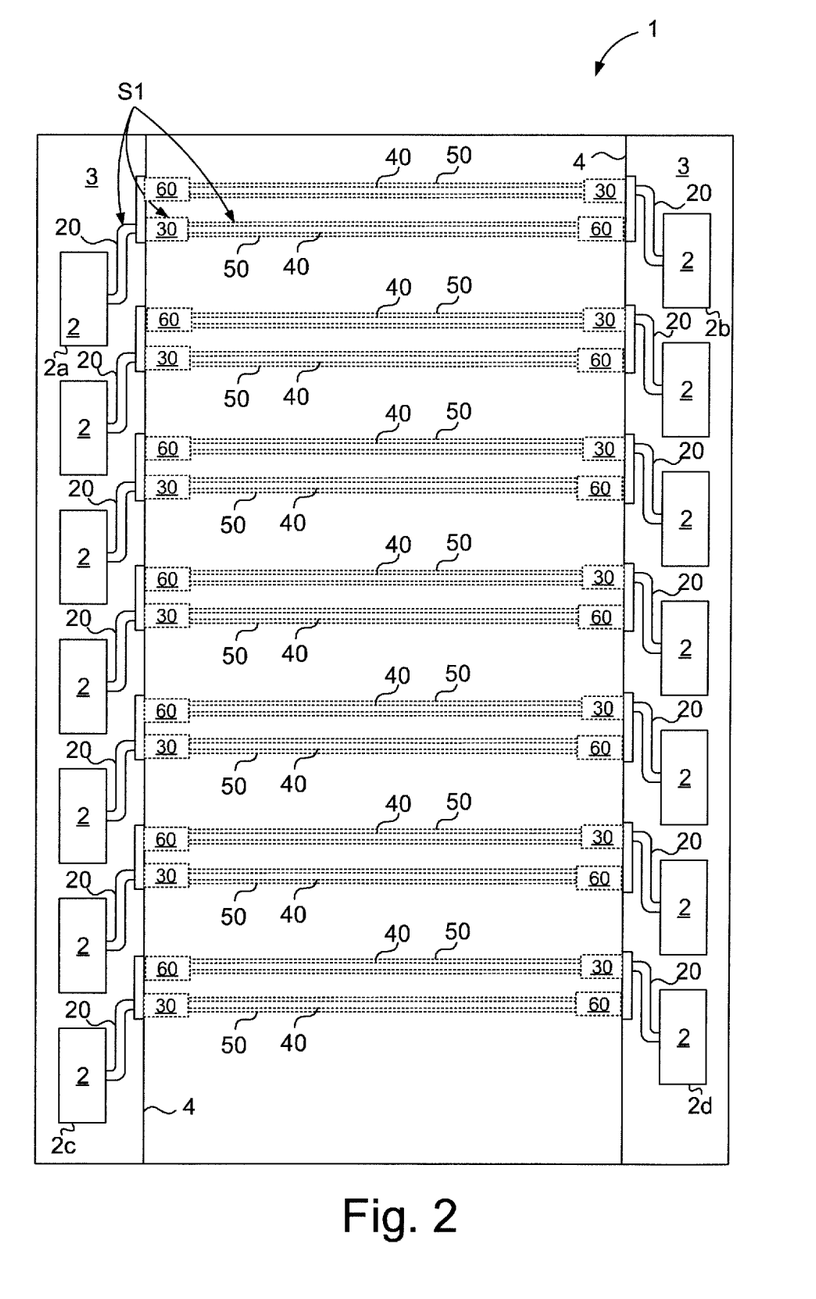
FIG. 2 schematically illustrates a plan view of the tracked vehicle in FIG. 1 with the suspension system according to the present invention.

FIG. 2 schematically illustrates a plan view of the tracked vehicle in FIG. 1 with the suspension system according to the present invention.

Figure 3:
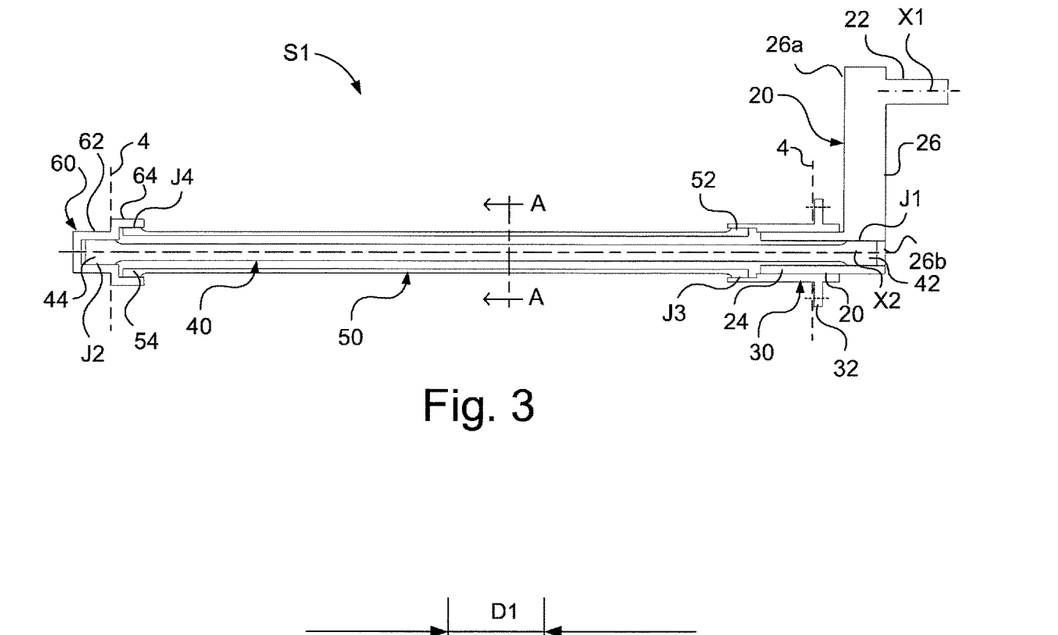
FIG. 3 schematically illustrates a plan view of a suspension arrangement according to an embodiment of the present invention.

The motor vehicle 1 comprises shock-absorbing members in the form of propulsion tracks 3 arranged on the respective side of the vehicle, and wheels 2 arranged on the respective side of the vehicle around which the respective propulsion track 3 runs. The wheels indicated with reference numbers 2a and 2b constitute a front wheel pair of the tracked vehicle and the wheels indicated with reference numbers 2c and 2d constitute a rear wheel pair of the tracked vehicle. The suspension system of the vehicle 1 comprises a plurality of suspension arrangements S1, of which only one is shown in FIG. 3. The respective suspension arrangement S1 comprises a road wheel arm 20 having a wheel axle portion configured to support a wheel 2 of the vehicle and a pivot axle portion. The respective suspension arrangement S1 comprises a housing 30 configured to be fixed to the vehicle body 4. The road wheel arm 20 is pivotably journalled at said pivot axle portion to the housing 30. The respective suspension arrangement S1 comprises a torsion bar 40 being connected to the pivot axle portion. The respective suspension arrangement S1 comprises a torsion tube 50 being connected to the vehicle body 4, said torsion bar 40 running through the torsion tube 50 and being connected to the torsion tube 50 in series via a connecting element 60, pivotably journalled in the opposite housing 30 or in a separate housing. The modulus of elasticity of the torsion tube material is lower than the modulus of elasticity of the torsion bar material.

By providing a torsion tube with a material having a modulus of elasticity that is lower than the modulus of elasticity of the material of the torsion bar the maximum suspension travel may be increased in an efficient way.

FIG. 3 schematically illustrates a plan view of a suspension arrangement S1 according to an embodiment of the present invention.

The suspension arrangement S1 comprises a road wheel arm 20. The road wheel arm 20 has a wheel axle portion 22 configured to support a wheel of the vehicle. The road wheel arm 20 further has a pivot axle portion 24. The road wheel arm 20 further has an intermediate arm portion 26 arranged between the wheel axle portion 22 and the pivot axle portion 24.

The wheel axle portion 22 is projecting from a first end area 26a of the intermediate arm portion 26 with a certain angle relative to the intermediate arm portion, the certain angle according to an embodiment being essentially perpendicular.

The pivot axle portion 24 is projecting, in the opposite direction as the wheel axle portion 22, from a second end area 26b of the intermediate arm portion 26 opposite to the first end are 26a with a certain angle relative to the intermediate arm portion such that the wheel axle portion 22 and the pivot axle portion 24 are essentially parallel.

When the suspension arrangement is installed in a vehicle, the wheel axle portion 22 is configured to extend in the transversal direction of the vehicle outwardly from a vehicle side so as to facilitate supporting a road wheel. The road wheel supported by the wheel axle portion 22 is arranged to rotate about an axis X1 of the wheel axle portion 22. The pivot axle portion 24 is extending in the opposite direction as the extension of the wheel axle portion 22 and is configured to be pivotably attached to the vehicle body 4.

The suspension arrangement S1 further comprises a housing 30 configured to receive the road wheel arm 20. The housing 30 is configured to be fixed to the vehicle body 4. The housing 30 comprises an attachment portion 32 for attaching the housing 30 to the vehicle body 4.

The road wheel arm 20 is pivotably journalled at the pivot axle portion 24 to the housing 30 configured to be fixed to the vehicle body 4.

The suspension arrangement S1 comprises a torsion bar 40. The torsion bar 40 has a first end portion 42 and an opposite second end portion 44. The first end portion 42 of the torsion bar 40 is connected to the pivot axle portion 24. The first end portion 42 of the torsion bar 40 is connected to the pivot axle portion 24 by means of a joint J1. The joint J1 is according to an embodiment a spline joint. The torsion bar 40 is thus connected to the pivot axle portion 24.

The suspension arrangement S1 comprises a connecting element 60. The connecting element 60 comprises a torsion bar connection portion 62 for connecting the torsion bar 40. The connecting element 60 comprises a torsion tube connection portion 64 for connecting the torsion tube 50. The connecting element 60 is configured to be pivotably journalled to the vehicle body 4. The connecting element 60 is according to an alternative variant configured to be pivotably journalled to a housing fixed to the vehicle body at the opposite side of the vehicle.

The second end portion 44 of the torsion bar 40 is connected to the connecting element 60. The second end portion 44 of the torsion bar 40 is connected to the connecting element by means of a joint J2. The joint J2 is according to an embodiment a spline joint. The torsion bar 40 is thus connected to the connecting element 60. The second end portion 44 of the torsion bar 40 is thus connected to the torsion bar connection portion 62 of the connecting element 60 by means of the joint J2. The torsion bar connection portion 62 comprises according to an embodiment a plain bearing arranged towards the vehicle body. The connection portion 62 comprises according to an embodiment a separate housing. The connection portion 62 is according to an embodiment part of the housing 30 which is then extended.

The suspension arrangement S1 comprises a torsion tube 50. The torsion bar 40 is configured to run through the torsion tube 50. The torsion tube 50 has a first end portion 52 and an opposite second end portion 54. The first end portion 52 of the torsion tube 50 is connected to the housing 30. The first end portion 52 of the torsion tube 50 is connected to the housing 30 by means of a joint J3. The joint J3 is according to an embodiment a spline joint, or another type of geometrical joint. The torsion tube 50 is thus connected to the housing 30.

The second end portion 54 of the torsion tube 50 is connected to the connecting element 60. The second end portion 54 of the torsion tube 50 is connected to the connecting element by means of a joint J4. The joint J4 is according to an embodiment a spline joint, or another type of geometrical joint. The torsion tube 50 is thus connected to the connecting element 60. The second end portion 54 of the torsion tube 50 is thus connected to the end portion 44 of the torsion bar 40 via connecting element 60 by means of the joints J2 and J4.

The torsion tube 50 is arranged to be connected to the vehicle body 4 via a connecting element 60, wherein the torsion bar 40 is connected to the torsion tube 50 via the connecting element 60.

The modulus of elasticity of the torsion tube material is lower than the modulus of elasticity of the torsion bar material. By providing a torsion tube 50 with a material having a modulus of elasticity that is lower than the modulus of elasticity of the material of the torsion bar 40 the maximum suspension travel may be increased in an efficient way. Hereby the vehicle length is unchanged and the vehicle weight is only slightly affected. Further, increase of maximum suspension travel may be obtained without a need to change location of the centre of gravity of the vehicle. By thus increasing the maximum suspension travel an increased vehicle speed in bumpy terrain is facilitated. Further, the risk to hit the road wheel suspension stop or to hit the ground with sprocket or idler is reduced. The invention also makes it possible to increase the ground clearance of the vehicle which, improves mobility in deep snow, reduces the risk to hit the belly when diving in rough terrain and also improves the resistance against mines due to an increased distance to the mine.

According to an embodiment of the suspension arrangement S1 said torsion tube material has a yield strength which essentially corresponds to the yield strength of the torsion bar material. This facilitates increasing the maximum suspension travel in that a relatively high yield strength, i.e. essentially the same yield strength as the torsion bar, facilitates providing a torsion tube with relatively thin walls and still being able to withstand the torque.

According to an embodiment of the suspension arrangement said torsion tube material has a modulus of elasticity in the range of 70-130 GPa.

According to an embodiment of the suspension arrangement said torsion bar material has a modulus of elasticity in the range of 200-215 GPa.

According to an embodiment of the suspension arrangement said torsion tube material has a yield strength in the range of 800-1500 MPa According to an embodiment of the suspension arrangement said torsion bar material has a yield strength in the range of 1500-2200 MPa. The yield strength of the torsion bar is obtained by strain hardening, wherein the torsion bar is rotated plastically to get negative stresses at the surface at unloaded condition.

According to an embodiment of the suspension arrangement said torsion bar 40 is made of steel. Steel is a very efficient material for a torsion bar due to the possibility to strain harden to a relatively high yield strength.

According to an embodiment of the suspension arrangement said torsion tube is made of titanium based material. Titanium is a very efficient material for a torsion tube as it provides a modulus of elasticity that is substantially lower than steel and has a yield strength that is essentially the same as steel.

Figure 4:
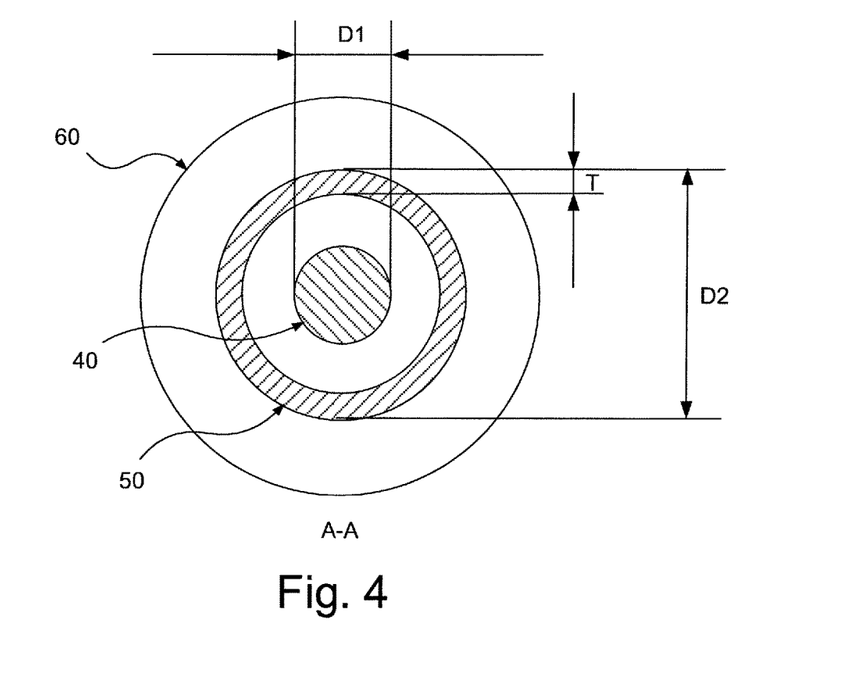
FIG. 4 schematically illustrates a vertical cross section of the suspension arrangement in FIG. 3.

FIG. 4 schematically illustrates a vertical cross section A-A of the suspension arrangement in FIG. 3.

According to an embodiment of the suspension arrangement S1 the torsion bar 40 has a diameter D1.

According to an embodiment of the suspension arrangement S1 the torsion tube 50 has an outer diameter D2.

According to an embodiment of the suspension arrangement said torsion tube 50 has wall thickness T.

Figures 5, 6A, 6B:
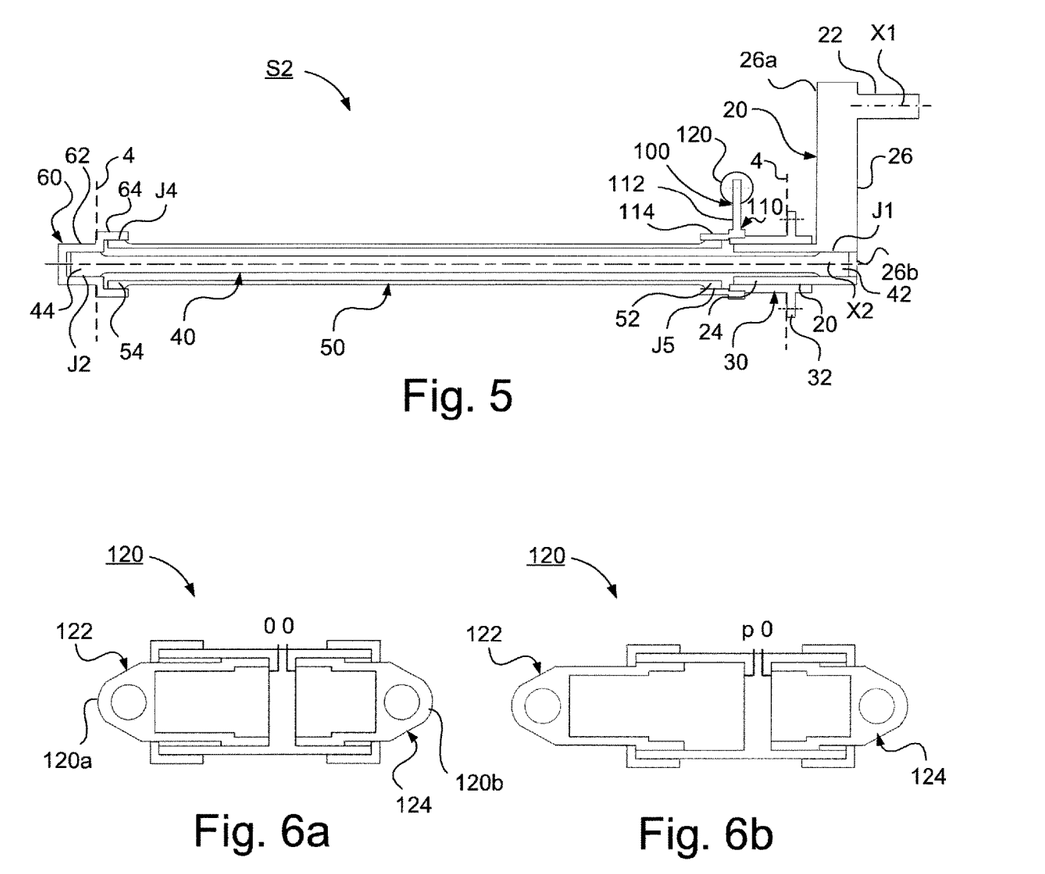
FIG. 5 schematically illustrates a plan view of a suspension arrangement according to an embodiment of the present invention.
FIG. 6a-d schematically illustrates an actuator unit 120 according to an embodiment of the present invention.

FIG. 5 schematically illustrates a plan view of a suspension arrangement S2 according to an embodiment of the present invention.

The suspension arrangement S2 according to the embodiment schematically illustrated in FIG. 5 differs from the suspension arrangement S1 according to the embodiment schematically illustrated in FIG. 3 in that it comprises a ground clearing arrangement 100.

Ground clearing arrangement 100 comprises a pivot anchor 110. The pivot anchor 110 is pivotably journalled at the housing 30.

The pivot anchor 110 comprises a lever arm portion 112 and a pivot portion 114, the lever arm portion 112 projecting from the pivot portion 114.

The pivot portion 114 of the pivot anchor 110 is pivotably journalled at the housing 30.

The first end portion 52 of the torsion tube 50 is in this embodiment connected to the pivot portion 114 of the pivot anchor 110. The first end portion 52 of the torsion tube 50 is connected to the pivot portion 114 of the pivot anchor 110 by means of a joint J5. The joint J5 is according to an embodiment a spline joint, or another type of geometrical joint. The torsion tube 50 is thus connected to the pivot portion 114 of the pivot anchor 110.

The pivot portion 114 is essentially ring shaped. The pivot portion 114 has an axial extension X2 corresponding to the axial extension of the pivot axle portion 24 and hence the housing 30 and the torsion bar 40 and torsion tube 50. The pivot portion 114 is arranged to surround a portion of the housing 30 its end area facing the road wheel arm 20 and surrounding the torsion tube 50 at is opposite end area. The torsion tube 50 thus has an axial extension such that the first end portion 52 of the torsion tube 50 ends prior to the housing 30 so as to facilitate the pivotably journalled connection to the housing 30 and the spline joint, or another type of geometrical joint to the torsion tube 50.

The ground clearing arrangement 100 comprises an actuator unit 120. The actuator unit 120 is arranged to be connected between the pivot anchor 110 and the vehicle body 4 for varying the ground clearance of the vehicle.

The actuator unit 120 is connected in one end to the lever arm portion 112 of pivot anchor 110 and in the other end the actuator unit 120 is fixed to the vehicle body 4.

By changing the length on the actuator unit 120 the ground clearance of the vehicle can be changed. By changing the length of the actuator unit 120 the road wheel arm 20 will be rotated via the torsion tube 50 which is connected to the torsion bar 40 via the connecting element 60 and by that change the ground clearance of the vehicle.

The actuator unit 120 is preferably a hydraulic cylinder. It is possible to use alternative actuators than a hydraulic cylinder, however hydraulic cylinders are most suitable when the forces are high and the stroke is short to get a compact installation.

FIG. 6a-d schematically illustrates an actuator unit 120 in the form of a hydraulic cylinder 120 according to an embodiment of the present invention.

The hydraulic cylinder 120 has a first end 120a configured to be connected to the lever arm portion 112 and a second end 120b opposite to the first end 120a, the second end being arranged to be connected to the vehicle body 4.

The hydraulic cylinder 120 according to this embodiment is a cylinder with two single-acting pistons 122, 124 with four fixed positions. The hydraulic cylinder 120 comprises a first piston 122 the end of which constituting the first end 120a of the hydraulic cylinder 120. The hydraulic cylinder 120 comprises a second piston 124 the end of which constituting the second end 120b of the hydraulic cylinder 120.

The first piston 122 is movable between a first position 0 and a second position p within the hydraulic cylinder 120 and the second piston 124 is also movable between a first position 0 and a second position p, this providing the four fixed positions. The distance between the first position 0 and the second position p for the first piston 122 is longer than the distance between the first position 0 and the second position p for the second piston 124.

In FIG. 6a the first piston 122 is in its first position 0 and the second piston 124 is in its first position 0, the hydraulic cylinder 120 hereby being compressed in a first compressed position.

In FIG. 6b the first piston 122 is in its second position p and the second piston 124 is in its first position 0, the hydraulic cylinder 120 hereby being in a second position.

Figures 6C, 6D:
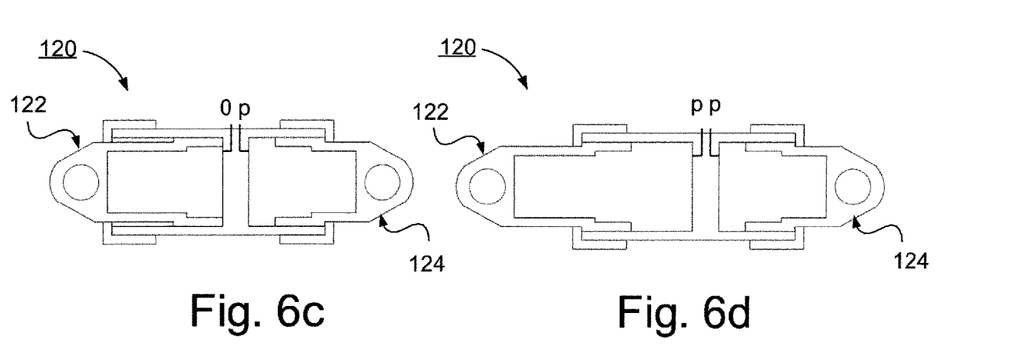

In FIG. 6c the first piston 122 is in its first position 0 and the second piston 124 is in its second position p, the hydraulic cylinder 120 hereby being in a third position.

In FIG. 6d the first piston 122 is in its second position p and the second piston 124 is in its second position p, the hydraulic cylinder 120 hereby being in a fourth position.

The hydraulic cylinder can alternatively be a single-acting cylinder with two fixed positions, or a position controlled hydraulic cylinder with continuous variation of the length. The cylinder would then need a level indicator.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. A suspension arrangement for a tracked vehicle, said suspension arrangement comprising:
   a road wheel arm having a wheel axle portion configured to support a wheel of the vehicle and a pivot axle portion, the road wheel arm being pivotably journalled at said pivot axle portion to a housing configured to be fixed to a vehicle body;
   a torsion bar being connected to the pivot axle portion; and
   a torsion tube being arranged to be connected to the vehicle body, said torsion bar running through the torsion tube and being arranged to be connected to the torsion tube, wherein a modulus of elasticity of the torsion tube material is lower than a modulus of elasticity of the torsion bar material so as to increase the maximum suspension travel.

2. The suspension arrangement according to claim 1, wherein said torsion tube material has a yield strength that corresponds to a yield strength of the torsion bar material.

3. The suspension arrangement according to claim 1, wherein said torsion tube material has a modulus of elasticity in a range of 70-130 GPa.

4. The suspension arrangement according to claim 1, wherein said torsion bar material has a modulus of elasticity in a range of 200-215 GPa.

5. The suspension arrangement according to claim 1, wherein said torsion tube material has a yield strength in a range of 800-1500 MPa.

6. The suspension arrangement according to claim 1, wherein said torsion bar material has a yield strength in a range of 1500-2200 MPa.

7. The suspension arrangement according to claim 1, wherein said torsion bar is made of steel.

8. The suspension arrangement according to claim 1, wherein said torsion tube is made of titanium alloy.

9. The suspension arrangement according to claim 1, wherein the torsion tube is arranged to be connected to the vehicle body via the housing, and wherein said torsion bar is connected to the torsion tube via a connecting element.

10. The suspension arrangement according to claim 1, further comprising a ground clearing arrangement comprising a pivot anchor pivotably journalled at the housing, said torsion tube being connected to a pivot portion of the pivot anchor, wherein an actuator unit is arranged to be connected between the pivot anchor and the vehicle body for varying a ground clearance of the vehicle.

11. The vehicle comprising a suspension arrangement according to claim 1.

* * * * *